United States Patent
Ku et al.

(10) Patent No.: US 7,485,995 B2
(45) Date of Patent: Feb. 3, 2009

(54) BEARING SUPPORT FOR USE IN A MOTOR

(75) Inventors: Chin-Long Ku, Tu-Cheng (TW); Chin-Wen Yeh, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 372 days.

(21) Appl. No.: 11/200,272

(22) Filed: Aug. 9, 2005

(65) Prior Publication Data

US 2006/0119200 A1 Jun. 8, 2006

(30) Foreign Application Priority Data

Dec. 4, 2004 (CN) .................... 2004 2 0102411 U

(51) Int. Cl.
*H02K 5/00* (2006.01)
(52) U.S. Cl. ..................... 310/91; 360/99.04
(58) Field of Classification Search .............. 310/67 R, 310/90–91; 360/99.04, 99.07, 99.12
See application file for complete search history.

(56) References Cited

U.S. PATENT DOCUMENTS

| | | | | |
|---|---|---|---|---|
| 5,363,003 | A * | 11/1994 | Harada et al. | 310/67 R |
| 6,072,261 | A * | 6/2000 | Lin | 310/254 |
| 6,617,736 | B1 * | 9/2003 | Horng et al. | 310/91 |
| 6,819,021 | B1 * | 11/2004 | Horng et al. | 310/91 |
| 6,882,074 | B2 * | 4/2005 | Horng et al. | 310/90 |

* cited by examiner

*Primary Examiner*—Tran Nguyen

(57) ABSTRACT

A bearing support for use in a motor includes a tube (50) having an exterior surface and an interior surface. A plurality of first protrusions (52) on the exterior surface of the tube (50) are provided for engaging a stator (2) of the motor mounted around the tube. A plurality of second protrusions (55) on the interior surface of the tube (50) are provided for engaging a bearing (60) of the motor. The first and second protrusions are alternated along a circumferential direction of the tube.

6 Claims, 2 Drawing Sheets

BEARING SUPPORT FOR USE IN A MOTOR

BACKGROUND

1. Field

The present invention is generally related to a bearing support for a motor, and particularly to a bearing support for use in a motor of an electric fan.

2. Prior Art

Referring to FIG. 1 of the present application, generally, a conventional electric fan includes an electric motor. The electric motor includes a frame 3 having a bearing support 30 with an upwardly extending tube 32 at a center thereof, a stator 2 mounted around the tube 32 of the bearing support 30, and a bearing 34 settled in the tube 32 of the bearing support 30. A rotor shaft 14 of a rotor 1 is rotatably mounted in the bearing 34 in axial direction of the motor.

The bearing and the stator are mounted to the tube of the bearing support by an interferential engagement with the tube of the bearing support so that the bearing and the stator can be fixed in position in relative to the tube of the bearing support. The interferential engagement of the stator induces a radially inward force acting on the tube of the bearing support. In the prior art design, such a force is directly transmitted to the bearing. When the force is too large, it may cause the bearing to adversely contact with the rotor shaft, thereby increasing friction between the bearing and the rotor shaft, and noise of the operation of the motor.

Therefore, it is desired to design a tube of a bearing support to reduce the friction and noise between the bearing and the rotor shaft caused by the radially inward force from the stator to the tube of the bearing support.

SUMMARY

The present invention has been made in view of the forgoing disadvantage of the prior art. Accordingly, it is an object of the present invention to provide a bearing support which is capable of reducing the transmission of the mounting force between the stator and the bearing support to the bearing directly. Therefore, the present invention could reduce the friction and noise made by the bearing and the rotor shaft even if the stator acts on the bearing support with an unduly large force due to an interferential engagement between the stator and the bearing support exceeding predetermined tolerance.

According to an embodiment of the present invention, a bearing support for use in a motor comprises a tube having an exterior surface and an interior surface. A plurality of first protrusions is formed on the exterior surface of the tube for engaging with a stator of the motor. Two neighboring first protrusions define a first gap therebetween. A plurality of second protrusions is formed on the interior surface of the tube for engaging with a bearing of the motor. Two neighboring second protrusions define a second gap therebetween. The first and second protrusions are alternated, whereby each first protrusion is located in alignment with a corresponding second gap along a radial direction of the tube.

The stator exerts a radially inward force through the first protrusions on the second gaps on the interior surface. Most of the radial force exerted by the stator acts on the tube at a location corresponding to the second gaps, rather on the second protrusions. Thus, even when a too large radial force is exerted on the tube due to an improper interferential engagement between the stator and the tube, a small part of the radial force will be transmitted to the bearing through the second protrusions directly. Thus, the disadvantage of the prior art that the unduly large engaging force between the stator and the bearing support will cause the bearing to have an adverse contact with the rotor shaft is overcome by the present invention.

DETAILED DESCRIPTION OF THE EMBODIMENT

Figure 1:
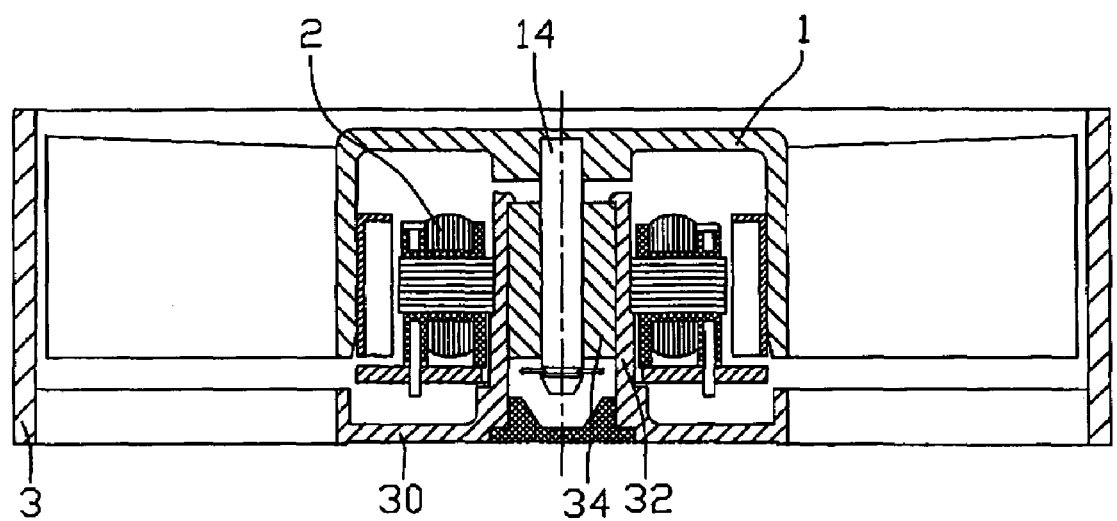
FIG. 1 is a cross-sectional view of a conventional fan.

Reference will now be made to the drawing figures to describe the present invention in detail.

Figure 2:
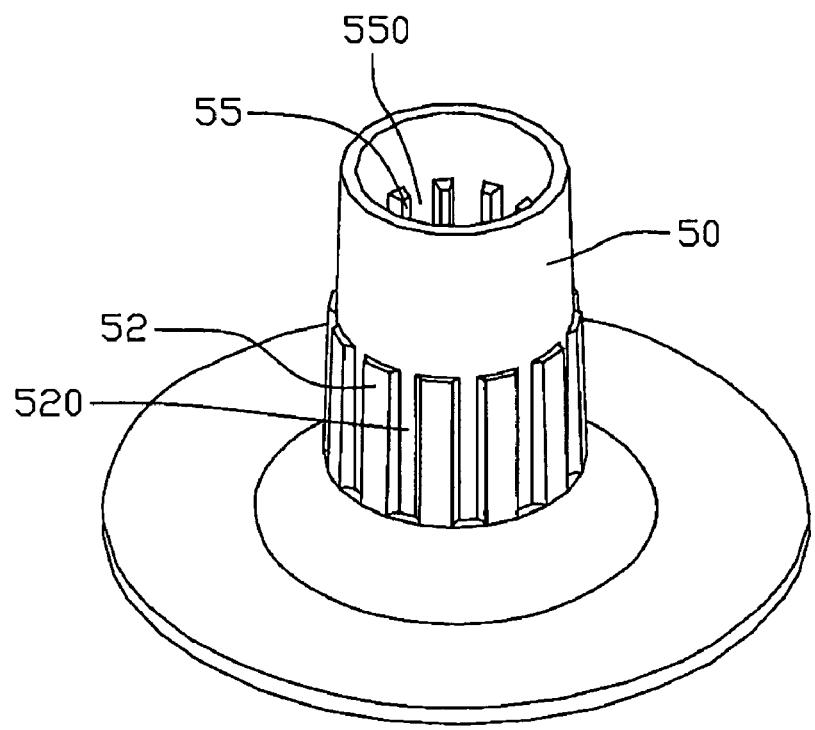
FIG. 2 is a perspective view of a bearing support according to the present invention.
Figure 3:
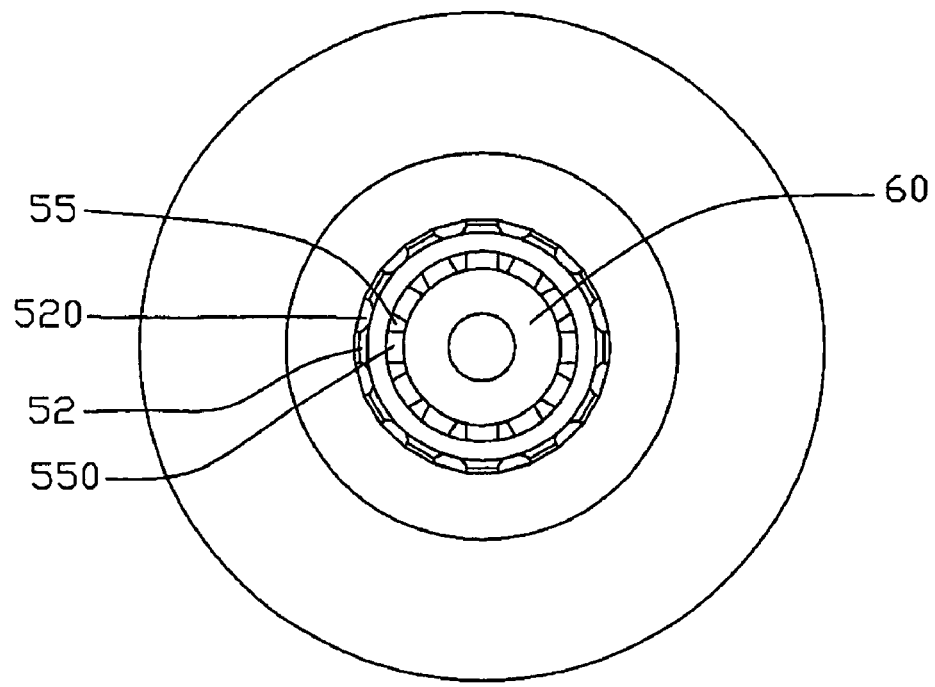
FIG. 3 is a top view of the bearing support of FIG. 2 with a bearing mounted in a tube of the bearing support.

Referring FIG. 2 to FIG. 3, a bearing support which is integral with a frame of a motor of an electric fan (not shown) is shown. The electric fan in accordance with the present invention, except the bearing support, is substantially the same as that shown in FIG. 1. Therefore, only the bearing support and a bearing 60 are shown in FIGS. 2 and 3. For other parts, persons skilled in the art can readily understand by referring to FIG. 1. A redundant repeat of the whole structure of the electric fan in accordance with the present invention is omitted from the drawings of the preferred embodiment of the present invention. The bearing support in accordance with the preferred embodiment of the present invention comprises a tube 50 projecting upwardly from a center of the bearing support. The tube 50 has an exterior surface (not labeled) and an interior surface (not labeled). An inner hole (not labeled) is defined in the tube 50 by the interior surface for fixedly accommodating the bearing 60 therein. There is a plurality of first protrusions 52 each of which is formed with a bar shape on the exterior surface of the tube 50, for mounting of a stator of the motor to the tube 50. The stator is mounted around the tube 50 by having an interferential engagement with the first protrusions 52 on the exterior surface of the tube 50. These first protrusions 52 are parallel with each other axially. Two adjacent first protrusions 52 form a first gap 520 therebetween. The first protrusions 52 and first gaps 520 are alternated along a circumferential direction of the tube 50.

There is a plurality of second protrusions 55 each of which is formed with a bar shape on the interior surface of the tube 50, for mounting of the bearing 60 of the motor in the tube 50. The bearing 60 is mounted in the inner hole of the tube 50 and has an interferential engagement with the second protrusions 55. These second protrusions 55 are parallel with each other axially. Two adjacent second protrusions 55 form a second gap 550 therebetween. The second protrusions 55 and second gaps 550 are alternated along the circumferential direction of the tube 50. The first 52 and second protrusions 55 are also alternated along the circumferential direction of the tube 50, so that each of the first protrusions 52 is located substantially in alignment with a corresponding second gap 550 along a radial direction of the tube 50.

When the stator is mounted to the first protrusions 52 of the tube 50, the stator exerts a radially inward force to the first protrusions 52. The force then acts on the tube 50 at positions where the second gaps 550 on the interior surface of the tube 50 are defined. Because the second gaps 550 do not contact with the bearing 60, the radial force would not press to the bearing 60 directly. Most of the radial force exerted by the stator will be absorbed by a deformation of the tube 50 at the positions where the second gaps 550 are defined. Only a small part of the radial force presses the bearing 60 through the second protrusions 55. Therefore the pressure exerting on the bearing 60 by the stator will not be exceedingly large to cause the bearing 60 to have an adverse contact with a rotor shaft even if the radially inward force exerted by the stator on the tube 50 is unduly large since a fitting between the stator and the tube 50 does not meet a predetermined tolerance.

In the embodiment mentioned above, the function of the first and second protrusions 52, 55 is to distribute the radial force from the stator 2 to portions of the tube 50 which do not contact with the bearing 60 directly, thereby reducing the influence of the radial force exerted by the stator to the bearing 60. It is well known by those skilled in the art that the shape of the first and second protrusions 52, 55 is not limited to the bar shape. Other shapes can also be used if the first protrusions 52 and the second protrusions 55 are alternated, and the radially inward force acting on the tube 50 by the stator will not directly act on the second protrusions engaging with bearing 50. Furthermore, the first and second protrusions 52, 55 can extend from bottom to reach to top of the tube 50 axially or by an angle respect to the axial direction of the tube 50 of the bearing support. The first and second protrusions 52, 55 can also spirally extend on the exterior and interior surfaces of the tube 50, respectively.

Furthermore, the second gaps 550 could be used as passageways for lubricating oil for the bearing 60 to circulate in the tube 50. When the rotor shaft rotates at high speed, the lubricating oil in the bottom of the tube 50 will move upwardly along an inner hole of the bearing 60 to reach a top of the bearing 60 thereby lubricating the bearing 60 and the rotor shaft simultaneously. Then the lubricating oil would move back along the second gaps 550 to return to the bottom of the tube 50, thereby to form a circulation for the lubricating oil in the tube 50. Thus, the lubrication of the bearing 60 and the rotor shaft is enhanced.

We claim:

1. A bearing support for use in a motor, comprising:
   a tube having an exterior surface and an interior surface;
   a plurality of first protrusions extending outwardly from the exterior surface of the tube, adapted for supporting a stator of the motor, and
   a plurality of second protrusions extending inwardly from the interior surface of the tube, adapted for supporting a bearing of the motor;
   wherein the first and second protrusions are alternated;
   wherein the tube is a circular tube, and the first and second protrusions are alternated along a circumferential direction of the tube; and
   wherein the first and second protrusions axially extend upwardly from bottom of the exterior and interior surfaces along an axial direction of the tube.

2. An electric motor comprising:
   a hollow bearing support which has a plurality of first protrusions extending outwardly from its exterior surface and a plurality of second protrusions extending inwardly from its interior surface, the first protrusions and the second protrusion being alternated with each other;
   a stator supported by the first protrusions of the bearing support;
   a bearing supported by the second protrusions of the bearing support;
   a rotor shaft rotationally mounted with the bearing; and
   a rotor connected with the rotor shaft;
   wherein the first and second protrusions on the bearing support each have a bar-shaped configuration; and
   wherein the first and second protrusions on the bearing support extend upwardly and axially from bottom of the exterior and interior surfaces.

3. An electric motor, comprising:
   a bearing support comprising an exterior surface and an interior surface defining an inner hole;
   a plurality of inner protrusions extending inwardly from the interior surface of the bearing support with a plurality of gaps between the inner protrusions;
   a stator mounted on the exterior surface of the bearing support;
   a plurality of outer protrusions extending outwardly from the exterior surface of the bearing support, and the stator engaging with the outer protrusions; and
   a bearing received in the inner hole, the bearing being adapted for rotatably engaging with a rotor shaft of the electric motor, the inner protrusions of the bearing support surrounding the bearing and engaging with an outer side surface of the bearing;
   wherein a radially inward force of the stator exerting on the bearing support is directed to at least one of the gaps between the inner protrusions;
   wherein the inner protrusions and the outer protrusions are alternated with each other.

4. The electric motor of claim 3, wherein the bearing support has a tubular configuration and the inner and outer protrusions each have a bar-shaped configuration.

5. The electric motor of claim 4, wherein the inner and outer protrusions are axially extended.

6. The electric motor of claim 5, wherein the inner and outer protrusions are extended upwardly from bottom of the bearing support.

* * * * *